April 24, 1956 F. PERLIN 2,742,787
THERMOMETERS
Filed Aug. 3, 1953

Inventor
FRED PERLIN
BY Howard J. Fischer
Attorney 2,742,787
Patented Apr. 24, 1956

2,742,787
THERMOMETERS

Fred Perlin, Oconomowoc, Wis., assignor to Brown & Bigelow, St. Paul, Minn., a corporation of Minnesota Application August 3, 1953, Serial No. 371,941

3 Claims. (Cl. 73—367)

This invention relates to a thermometer wherein the thermostatic element is mounted in a free wheeling manner so that it may be freely revolved around a supporting axis, yet has the property of being counterbalanced so that the indicating arm will properly indicate the temperature when the element comes to rest.

A feature resides in providing a thermometer for registering the temperature which contains a unit enclosed within a perforated casing having a thermostatic element fixed on one end to the casing and the other end being fixed to a hub which supports a counterbalancing element. The whole casing unit is mounted freely rotatable on a shaft while the shaft in turn is supported on a transparent plastic or similar disk. The unit includes the casing or housing for enclosing the thermostatic element and an indicator arm or pointer is provided to indicate the degrees of temperature. The indicator arm is fixed to the housing or casing in which the thermostatic element is enclosed.

It is also a feature to provide a thermometer which, from all appearances, seems to be supported in space because it is mounted upon the transparent plastic disk. The transparent plastic disk has formed therein indicia to indicate the degrees of temperature. This indicia may be indicated by the numerals such as 50, 60, 70 etc. and between which gauge marks are shown on the transparent disk so that the thermometer pointer can indicate the temperature on either side of the respective numerals indicia such as 73° or 69° etc.

My thermometer has certain intriguing features such as indicating the temperature on a transparent disk with an element that seemingly hangs in space and which element with its pointer can be whirled around on its support without interfering with the efficiency of the thermometer. The thermostatic element is protected by the casing surrounding the same and when once the element is properly set, it will accurately indicate the temperature. The counterbalancing element in the casing associated with the thermostatic element uniformly balances the indicating pointer of a thermometer which is adapted to swing freely in front of the transparent plastic disk upon which the temperature indicia is formed. The transparent disk is mounted on a base so as to support the same in upright position, and in view of the transparent nature of the disk, objects are visible through the same, thus enhancing the appearance of the whole thermometer. Furthermore, this transparent supporting disk attracts the curiosity of the observer and the result is that the observer endeavors to touch the thermostatic indicator unit whereupon the indicator unit will freely rotate on its supporting axis and yet when the same comes to rest, the temperature indicating pointer will accurately indicate the temperature, thus intriguing the observer and stimulating his curiosity as to the operation of this thermometer.

The foregoing features indicate to a large extent the objects of my invention. However, other objects and features together with the details of my thermometer will be more clearly and fully set forth throughout the specification and claims.

In the drawings, I have indicated my thermometer.

Figure 1:
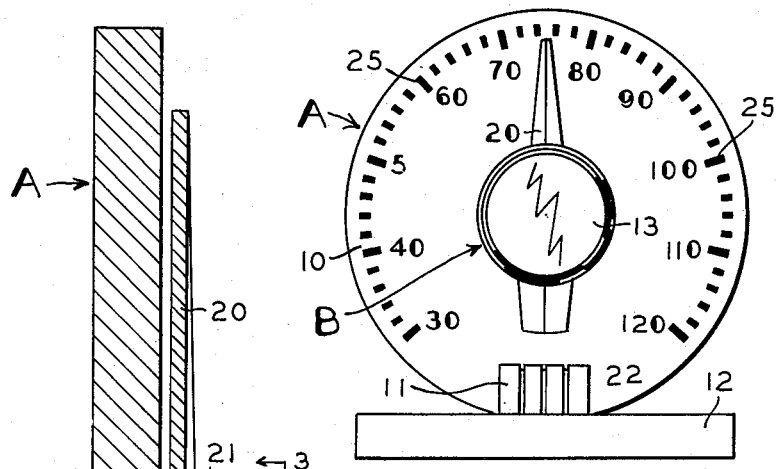
Figure 1 illustrates a front face view of my thermometer.
Figure 2:
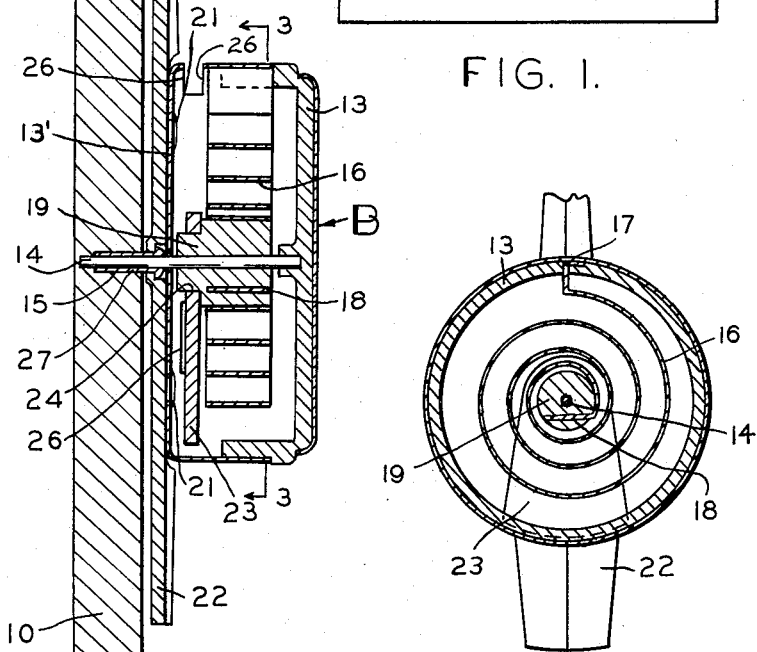
Figure 2 is an enlarged vertical section on the line 2—2 of Figure 1 of my thermometer with a portion of the supporting base broken away.
Figure 3:
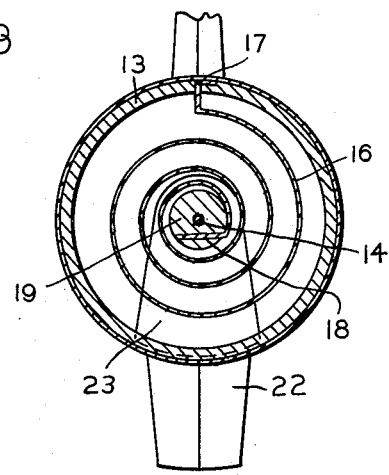
Figure 3 is a section on the line 3—3 of Figure 2.

In the drawings, the thermometer A is adapted to be formed by a transparent disk 10 which is mounted in the upright support 11 projecting from the top of the base 12.

The thermostatic unit B is self-contained within the casing 13 and the whole unit B is mounted freely rotatable on a supporting shaft 14 which is fixedly secured at 15 to the transparent disk 10.

The thermostatic unit contained in the casing 13 includes a helically wound thermostatic element 16 with one end thereof anchored at 17 in the casing 13 and the other end 18 anchored in the hub portion 19.

The hub 19 is adapted to rotate freely on the shaft 14, the rear wall 13' of the casing 13 is secured to a temperature indicating pointer 20 by the rivets 21. The pointer member 20 is formed with a lower end 22 which normally projects below the casing 13. The portion of the pointer 22 projecting below the casing 13 is adapted to provide a balance to tend to balance the temperature pointer 20.

Within the casing 13 and mounted on the hub 19, I provide a counterbalance weight 23. The weight 23 is fixed to the hub 19 at 24. The weight 23 balances the thermometer unit B with its indicating arm 20 to normally hold the unit B in upright balance. The counterbalance weight 23 depends downwardly at all times and it together with the hub 19 does not rotate except, of course, when the unit B is spun around on the shaft 14.

The thermostatic element 16 operates by the temperature to expand or contract, and thus, causes the temperature indicating arm or pointer 20 to move to indicate by the indicia 25, which is formed on the face of the transparent plastic disk 10, the temperature of the atmosphere. As the pointer 20 and the casing 13 are moved by the element 16, the weight 23 and the hub 19 do not move, the counterweight acting as a form of fixed point. The casing 13 is formed with a series of slotted openings 26 to freely permit the air of the atmosphere to freely contact the thermostatic element 16.

The thermostatic unit B is floatingly mounted on the shaft 14 and one end 17 of the thermostatic element 16 is mounted in the casing 13 while the other end 18 thereof is mounted in the hub 19 which is freely rotatable on the shaft 14. Thus, in this respect, my thermostatic unit and thermometer differs from ordinary old types of thermometers where one end of the thermostatic element was fixed to a rigid non-movable portion of the thermometer and the other end was fixed to the indicating pointer which indicated the temperature. However, in my thermometer, I have departed from the regular practice of mounting the ends of the thermostatic elements and floatingly mounting the whole unit B so that the same may rotate around the shaft 14. However, I have also provided a counterbalance weight 23 against which force the thermostatic element must work in the movement of the temperature pointer 20.

The shaft 14 is rigidly fixed in the plastic disk 10 at 15; however, the head of the hollow rivet 27 holds the unit B on the shaft 14. The attractive nature of my thermometer intrigues the observer who is inclined to touch the element B or the pointer 20 whereupon the same will rotate on the shaft 14 and the observer may, if he desires, whirl the entire unit B around on the shaft 14; nevertheless, when the unit B comes to rest, it will set the pointer 20 at the proper degree on the indicia 25 to indicate the temperature.

The new principle of floatingly mounting the entire thermostatic unit B in relation to the fixed indicia provides a thermometer of an attractive nature of having the utility of indicating the temperature as well as counterbalancing the unit so that even though it is whirled around on the shaft 14, it will always right itself to indicate the proper temperature when it comes to rest.

I claim:

1. In a thermometer, a support member having a shaft extending therefrom, a floating counterweight anchor member rotatably mounted on said shaft, a bi-metal thermostatic strip, a pointer member rotatably mounted on said shaft, means connecting one end of said bi-metal strip to said floating counterweight anchor member and the other end to said pointer member whereby said pointer is actuated by said bi-metal strip and at the same time rotatable on said shaft.

2. A thermometer for indicating the temperature including a fixed transparent disk upon which indicia is formed for indicating the degrees of temperature, a thermostatic unit mounted upon a fixed shaft supported by said transparent disk, said unit including a thermostatic element, the ends of said element being movable relative to one another in response to the temperature to which said element is exposed, a hub rotatably mounted on said shaft and to which one end of said element is secured, a casing enclosing said thermostatic unit and to which the other end of said element is attached, a pointer secured to said casing and adapted to be moved over said indicia, and a counter-balancing means secured to said hub to supply a resistance to the movement of the said one end of said element, whereby the relative movement of the said ends causes the said other end to rotate pointer and casing about said hub in response to change in temperature to which the element is exposed, with the said thermostatic unit remaining freely rotatable on said shaft.

3. An indicating thermometer comprising a base member, an upstanding support member attached to said base member, indicia formed upon said support member, a shaft affixed to said upstanding support member, a pointer rotatable upon said shaft, counter-balancing means rotatable upon said shaft, a helical thermostatic element wound about said shaft, one end of said thermostatic element being affixed to said counter-balancing means and the other end of said element being affixed to said pointer, whereby said counter-balancing means provides resistance to the expansion and contraction of said thermostatic element, thereby causing said pointer to rotate relative to said counter-balancing means to indicate the ambient temperature, said pointer together with said thermostatic element and said counter-balancing means being freely rotatable about said shaft and self-resettable to indicate the correct ambient temperature.

References Cited in the file of this patent

UNITED STATES PATENTS

| 2,284,048 | Ford | May 26, 1942 |

FOREIGN PATENTS

| 413,405 | Germany | May 9, 1925 |
| 1,007,924 | France | Feb. 13, 1952 |